United States Patent [19]

Hoopengardner

[11] Patent Number: 4,714,514

[45] Date of Patent: Dec. 22, 1987

[54] BASEPLATE CONSTRUCTION FOR AN IRON USED TO FACE SEAM CARPET WITH HOT MELT ADHESIVE TAPE

[75] Inventor: Merle R. Hoopengardner, Lafayette, Calif.

[73] Assignee: Orcon Corporation, Union City, Calif.

[21] Appl. No.: 876,838

[22] Filed: Jun. 20, 1986

[51] Int. Cl.$^4$ .................. B29C 65/20; D06F 75/38
[52] U.S. Cl. .................. 156/391; 156/304.4; 156/499; 156/500; 156/505; 156/545; 156/579; 219/245
[58] Field of Search .................. 156/157, 583.1, 304.1, 156/304.3, 304.4, 304.6, 304.7, 309.6, 500, 505, 574, 579, 545, 391, 499; 219/243, 245; 264/284, 293

[56] References Cited

U.S. PATENT DOCUMENTS

| | | | |
|---|---|---|---|
| 3,523,176 | 8/1970 | Hill | 219/245 |
| 3,582,436 | 6/1971 | Bucher | 156/545 |
| 3,927,298 | 12/1975 | Prater | 219/245 |
| 4,536,244 | 8/1985 | Greci et al. | 156/304.4 |

*Primary Examiner*—Michael Wityshyn
*Attorney, Agent, or Firm*—Donald C. Feix

[57] ABSTRACT

A baseplate for a carpet seaming iron of the kind used for making a face seam with hot melt adhesive tape has the underside of the base plate formed with a forward, flat surface and a rearward, ribbed surface. The underside also has a longitudinally extending center groove shaped to form a raised bead of molten adhesive at the outlet end of the iron for coating the side edges of the carpet backings with hot melt adhesive. The forward, flat surface provides maximum contact for heating of the hot melt adhesive; and the rearward, ribbed surface meters the molten adhesive evenly over the full width of the tape. The forward ends of the ribs are longitudinally offset so as to form a V shape which helps to funnel molten adhesive both into the channels between the ribs and into the center groove at the apex of the V as the iron is moved along the tape.

7 Claims, 3 Drawing Figures

BASEPLATE CONSTRUCTION FOR AN IRON USED TO FACE SEAM CARPET WITH HOT MELT ADHESIVE TAPE

CROSS-REFERENCE TO RELATED PATENT

U.S. Pat. No. 4,536,244 issued Aug. 20, 1985 to John J. Greci and Merle R. Hoopengardner and assigned to Orcon Corporation (the same assignee as the assignee of this application) discloses and claims a carpet seaming iron having a baseplate construction which includes a longitudinally extending center groove. The center groove has a length, depth, width, and alignment effective to form, in the layer of molten adhesive produced behind the moving iron, a raised center bead. The bead is formed with a sufficient height and stiffness to coat the side edges of the carpet backings with hot melt adhesive as the undersides of the carpet backings are lowered onto the layer of molten adhesive. This causes the side edges of the backings to be locked directly together through the adhesive interposed between the side edges.

The baseplate construction of the present invention incorporates, in the lower, adhesive engaging surface of the baseplate, such a longitudinally extending center groove, and the groove is effective to produce the same result.

The underside of the baseplate of the present invention is also formed with a forward, flat surface and a rearward, ribbed surface. The forward, flat surface provides good heating contact with the adhesive. The rearward, ribbed surface has longitudinally extending ribs which project outwardly from the plane of the flat surface. The leading edges of the ribs are longitudinally offset and form a V shape construction for helping to funnel molten adhesive both into the channels between the ribs and into the center groove located at the apex of the V as the iron is moved along the tape.

The baseplate of the present invention can be used in place of the baseplate of the iron shown in U.S. Pat. No. 4,536,244 without any modification of the other structure of the iron.

The U.S. Pat. No. 4,536,244, as noted above, is assigned to the same assignee as the assignee of this application; and the U.S. Pat. No. 4,536,244 is incorporated by reference in this application.

SUMMARY OF THE INVENTION

This invention relates to a baseplate construction for an iron of the kind used to face seam carpet pieces with hot melt adhesive tape.

This invention relates particularly to the construction of the lower surface of the baseplate—a construction in which the forward part of the surface of the baseplate has a flat surface for providing good heating contact of that forward surface with the adhesive and in which the rearward part of the lower surface of the baseplate has a ribbed surface formed with a number of longitudinally extending ribs which project from the plane of the forward, flat surface and which have leading edges longitudinally offset so as to form a V shape construction for helping to funnel molten adhesive both into the channels between the ribs and into a center groove at the apex of the V as the iron is moved along the tape.

As noted above, the longitudinally extending center groove forms a raised center bead of adhesive in the molten hot melt adhesive produced at the outlet of the iron. The raised center bead coats the side edges of carpet backings with hot melt adhesive. These edges are locked directly together by the interposed hot melt adhesive after the adhesive cools to a solid condition.

The flat, forward surface puts a maximum amount of the iron heating surface in direct contact with the hot melt adhesive and thus enables the hot melt adhesive on the tape to be heated to a molten condition in the shortest possible time.

The rearward, ribbed surface meters the molten adhesive evenly over the full width of the tape just prior to the pressing down of the carpet backings into the molten adhesive at the rearward, outlet end of the iron. This ribbed surface, in combination with the V shape provided by the offset forward edges of the ribs, helps to insure that the molten adhesive is not too thick on one side of the tape and too thin on the other side of the tape, a condition which can happen with improper operation of irons having a continuous flat undersurface without any ribs. If a carpet installer should rock an entirely flat surface iron too much to one side in the course of making a seam, the molten adhesive can be pushed toward one side of the tape and can result in a too thick on one side/too thin on the other side distribution of molten adhesive across the width of the tape at the outlet of the iron.

For most carpet backings the ratio between the length of the flat surface and the length of the ribbed surface is not critical but can be in the range of about ¼ to ⅜ of the length flat with the remainder of the length used for the ribbed surface. Having at least the first quarter of the lower surface formed with the flat surface will, with most of the hot melt adhesives currently being used on carpet seaming tapes, bring the temperature of the hot melt adhesive up to a level at which the remaining, ribbed surface can provide both the proper metering of adhesive evenly across the full width of the tape and can also insure that sufficient molten adhesive is funneled into the longitudinally extending center groove so as to provide the desired, raised bead of molten adhesive which is effective to coat the facing edges of the carpet backings at the rearward, outlet end of the iron.

The length of the center groove is, for most adhesives and most carpet backings, not critical so long as the groove is located at the very back edge of the baseplate and has the proper depth and proper width. The depth and width of the groove are more significant than the length in insuring that the desired, upstanding bead of molten adhesive is formed within the ususal range of speeds at which an operator generally moves the iron along the tape in the course of making a seam. In some cases, the length of the groove may be as short as ⅛ inch. However, longer lengths are preferred; and, in fact, the most preferred form is to have the longitudinal groove extend along the entire length of the baseplate.

Baseplate constructions and configurations for a hot melt adhesive carpet seaming iron which incorporate the features described above and which are effective to function in the ways described above constitute specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles.

Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

DETAILED DESCRIPTION OF THE PREFERRED EMBODIMENTS

A carpet seaming iron constructed for face seaming carpet pieces with hot melt adhesive tapes is illustrated and described in the above noted U.S. Pat. No. 4,536,244 which is incorporated by reference in this application.

Figure 3:
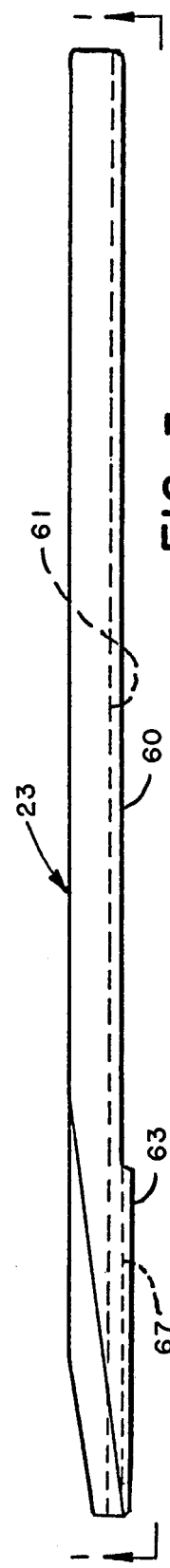
FIG. 3 is a side elevation view taken along the line and in the direction indicated by the arrows 3—3 in FIG. 1.

The baseplate of the present invention is constructed to be used with the iron shown in the U.S. Pat. No. 4,536,244 and is a replacement for the baseplate 23 shown in FIG. 3 of the U.S. Pat. No. 4,536,244. The baseplate of the present invention incorporates a longitudinally extending, center groove like the groove 61 shown in FIG. 4 of the U.S. Pat. No. 4,536,244 for forming a raised bead of adhesive (like the raised bead 59 shown in FIGS. 12 and 13 of the U.S. Pat. No. 4,536,244), at the outlet end of the baseplate and the iron; and center grove of the present invention will be indicated by the same reference numeral 61 in the following description of the structure shown in the drawings.

Figure 1:
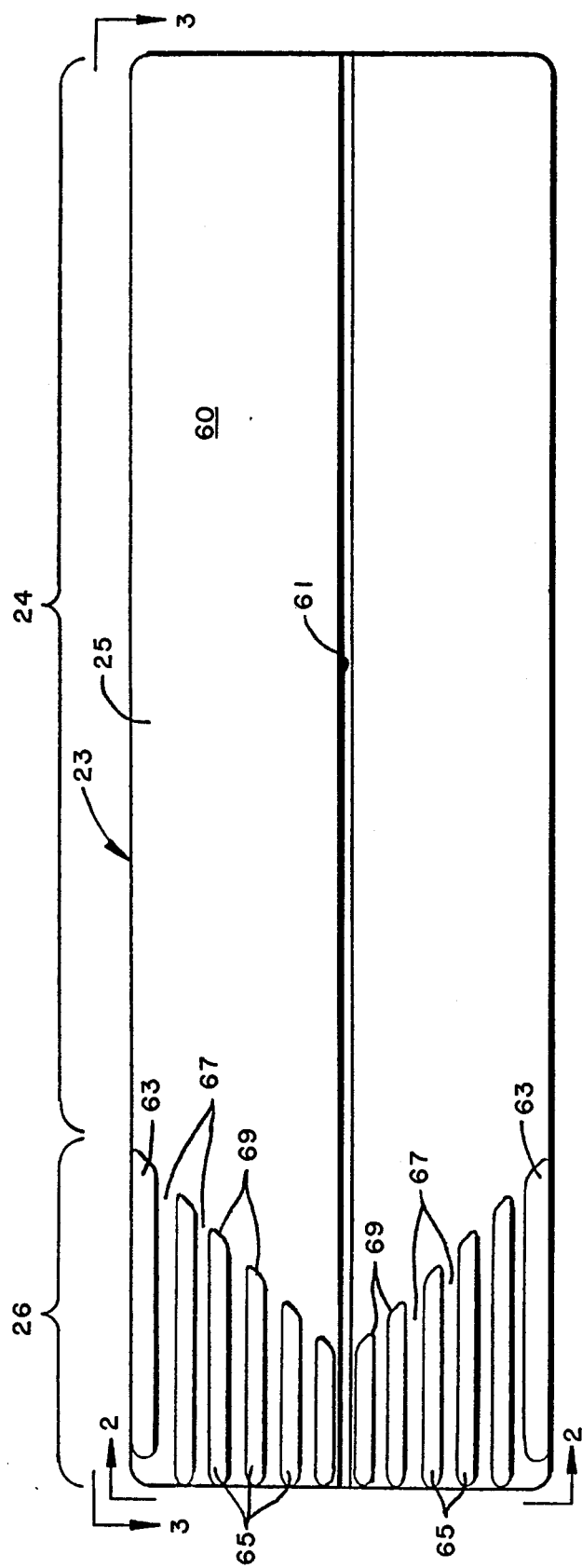
FIG. 1 is a plan view of the underside of a baseplate for a carpet seaming iron constructed in accordance with one embodiment of the present invention.

As best shown in FIG. 1, the baseplate 23 has an underside 25 which comprises a forward part 24 and a rearward part 26.

The forward part 24 is formed with a flat surface 60, and the rearward part 26 is formed with a ribbed surface. In the specific embodiment shown in FIG. 1 the forward, flat surface 60 takes up the major part of the length of the iron while the length of the rearward, ribbed surface 26 takes up less than ¼ of the length.

This length ratio is suitable for many carpet seaming tapes because it provides a large amount of flat surface for contact with the hot melt adhesive and thus enables the iron to heat the hot melt adhesive to a molten condition in a relatively minimum amount of time. This in turn means that the installer can move the iron along the tape relatively quickly. The longitudinal extent of the rearward, ribbed surface 26 shown in FIG. 1 is sufficient to provide the desired metering of the molten adhesive evenly across the full width of the tape at the outlet of the iron.

Other ratios of the length of the forward part 24 to the length of the rearward part 26 can, however, be used with satisfactory results. For example, with many tapes the forward flat part 24 may extend over just the first one-quarter of the length, because this amount of flat area will provide a generally satisfactory rate of heating of the hot melt adhesive to a molten condition.

Figure 2:
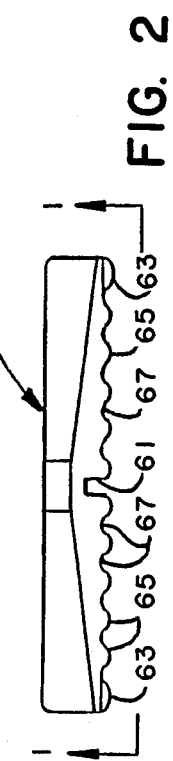
FIG. 2 is an end elevation view taken along the line and in the direction indicated by the arrows 2—2 in FIG. 1.

As illustrated in FIG. 1, the ribbed part 26 has two outer ribs 63 which are preferably somewhat thicker across than the other longitudinally extending ribs 65 disposed inwardly from the two outer ribs 63. As also illustrated in FIG. 2, channels 67 extend between the inner ribs 65 and between each outer rib 63 and the adjacent inner rib 65.

As shown in FIG. 1, the leading edges 69 of the ribs are longitudinally offset so as to form a V shape construction for helping to funnel molten adhesive both into the channels 67 between the ribs and into the longitudinal center groove 61 at the apex of the V shape as the iron is moved along the tape.

This V shape construction thus coacts with the ribs and associated channels to meter the molten adhesive evenly over the full width of the tape and also helps to insure that the longitudinal center groove 61 is always supplied with an adequate resevoir of molten adhesive for forming the raised center bead as described above. In this embodiment the center groove preferably runs at least from the apex of the V to the rearward or trailing end of the baseplate. Preferably the groove extends the entire length of the baseplate, but it may be much shorter, running only from the apex of the V to the trailing edge of the baseplate.

As illustrated in FIG. 1, the legs of the V extend at an angle of about 45° with respect to the center groove 61. This V or chevron shape can be formed at a smaller angle, such as 20°, for example, with respect to the center groove 61. Using smaller angles reduces the amount of area which can be occupied by the forward, flat surface 60.

The leading edges 69 are rounded as illustrated to avoid snagging fibers or yarns commonly used on carpet seaming tapes.

In a specific embodiment of the present invention the overall width of the baseplate 23 is 3 inches, the length is 10 inches, and the maximum thickness is 0.290 inch. The minimum width of the channel 61 is 0.093 inch at the top or innermost portion of the channel, and the sides of the channel diverge slightly in a downward direction so as to facilitate manufacture of the baseplate by molding. Thus, the channel has a width of about 0.1 inch.

In this specific embodiment the ribs 63 and 65 have a height of 0.06 inch with respect to the plane of the flat surface 60.

The depth of the channel 61 with respect to the plane of the flat surface 60 is 0.137 (about ⅛) inch, or about 0.2 inch with respect to the height of the ribs.

A baseplate having these specific dimensions has been found satisfactory for use with the viscosities of hot melt adhesives of all carpet seaming tapes currently commercially available at the time of filing this application.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A carpet seaming iron of the kind used for making a face seam between two pieces of carpet by heating a layer of hot melt adhesive on a carpet seaming tape positioned beneath the carpet backings at the seam and extending along the length of the seam, said iron comprising, baseplate means having a lower surface engageable with the hot melt adhesive layer on the tape for heating the hot melt adhesive to a molten condition as the iron is moved along the tape, handle means for manually moving the iron along the tape and beneath the carpet backings at the seam, surface means on the upper surface of the iron and engageable with the undersides of the carpet backings for progressively lifting the backings from the tape at the front of the iron, as the iron is moved along the tape, and then lowering the backings onto the layer of molten adhesive at the back of the iron, groove means formed in the lower surface of the baseplate means and including a longitudinally extending, center groove having a length, depth, width, and alignment effective to form, in the layer of molten adhesive produced behind the moving iron, a raised center bead of a sufficient height and stiffness to coat the side edges of the carpet backings with hot melt adhesive as the undersides of the carpet backings are lowered onto the layer of molten adhesive and to thereby cause said side edges of the backings to be locked directly together through the adhesive interposed between said side edges, and flat surface means at the forward part of the lower surface of the baseplate means having a sufficient length to heat the hot melt adhesive to a molten state and to therefore speed up the seaming process, said flat surface means including a flat surface which extends from the front of the baseplate over the first ¼ to ⅜ of the lower surface for providing good heating contact of that forward surface with the adhesive, and wherein the rearward part of said lower surface has a ribbed surface formed with a number of longitudinally extending ribs projecting from the plane of said flat surface to meter the molten adhesive evenly over the full width of the tape and wherein the leading edges of the ribs are longitudinally offset so as to form a V shape construction for helping to funnel molten adhesive both into the channels between the ribs and into said center groove at the apex of the V as the iron is moved along the tape.

2. The invention defined in claim 1 wherein the longitudinal groove extends the full length of the said lower surface of the baseplate means.

3. The invention defined in claim 1 wherein the longitudinal groove extends only from the apex of the V shape to the rear edge of said baseplate means.

4. The invention defined in claim 3 wherein the longitudinal groove has a length of at least one-eighth inch.

5. The invention defined in claim 1 wherein each leg of the V extends at an angle of substantially 45° with respect to said longitudinal groove.

6. The invention defined in claim 1 wherein the ribs have a height of about 0.06 inch with respect to said flat surface, said longitudinal groove has a depth of about 0.2 inch with respect to the maximum height of the ribs and a depth of about one-eighth inch with respect to said flat surface, and the said longitudinal groove has a width of about 0.1 inch.

7. A baseplate for a carpet seaming iron of the kind used for making a face seam between two pieces of carpet by engaging the baseplate with a layer of hot melt adhesive on a carpet seaming tape positioned beneath the carpet backings at the seam and progressively heating the adhesive beneath the iron to a molten condition as the baseplate of the iron is moved longitudinally along the seam, said baseplate having a lower, adhesive engaging surface comprising, a forward, flat surface which extends from the front of the baseplate over the first ¼ to ⅜ of the lower surface, said flat surface providing a surface which permits good heating contact with the adhesive, a rearward, ribbed surface comprising a plurality of longitudinally extending ribs of varied length with each outer rib having a longer length than an adjacent inner rib and with each rib having an angled front edge so that the forward ends of the ribs form a V shape construction with the apex of the V located at the longitudinal center line of the base plate, and groove means formed in said lower surface of the baseplate and including a longitudinally extending, center groove having a length, depth, width and alignment effective to form, in a layer of molten adhesive produced behind the moving iron, a raised center bead of a sufficient height and stiffness to coat the side edges of the carpet backings with hot melt adhesive as the undersides of the carpet backings are lowered onto the layer of molten adhesive at the rearward edge of the iron and to thereby cause said side edges of the backings to be locked directly together through the adhesive interposed between said side edges, and wherein the V shape formed by the forward edges of the ribs helps to funnel molten adhesive both into the channels between the ribs and into said center groove at the apex of the V as the iron is moved along the tape.

* * * * *